Patented Sept. 8, 1953

2,651,626

UNITED STATES PATENT OFFICE 2,651,626

VINYL HALIDE-VINYLIDENE HALIDE-ACRYLIC ESTER TRIPOLYMERS

Willem Leendert Johannes de Nie, Amsterdam, Netherlands, assignor to Shell Development Company, San Francisco, Calif., a corporation of Delaware No Drawing. Application July 14, 1947, Serial No. 760,926. In the Netherlands March 23, 1944

Section 1, Public Law 690, August 8, 1946
Patent expires March 23, 1964

15 Claims. (Cl. 260—80.5)

This invention relates to a novel copolymerization process and the novel products produced thereby. More particularly, the invention relates to the copolymerization of a vinyl halide, with a vinylidene halide and with an acrylic type compound.

Copolymers obtained by the copolymerization of vinyl halides and vinylidene halides are well known in the art. For instance, such copolymers containing from about 35% to 85% by weight of a vinyl halide are readily soluble in the usual lacquer and varnish solvents and are used as a raw material for lacquer. However, such copolymers have the disadvantage of having poor film-forming characteristics when applied to metals, which drawback is particularly noticeable when they are applied to the light metals such as aluminum and magnesium alloys. Other copolymers of vinyl halides with vinylidene halides in which the polymerized vinyl halide content is less than about 35% or greater than about 85%, by weight, may be used for the fabrication of molded or extruded products, but such products are frequently brittle unless large quantities of plasticizers are used.

The objects of the present invention are to provide copolymers which may be used as a lacquer ingredient and which have good film-forming characteristics and good adherence to metals, particularly to the light metals. Another object of this invention is to provide copolymers which may be used in the fabrication of molded articles and which require the use of little, if any, plasticizer. A further object is to provide plastics with good physical characteristics including high scratch and water resistance.

In general, the objects of the present invention are accomplished by copolymerizing with the vinyl halide and vinylidene halide a minor amount of an acrylic or methacrylic compound. The amount of the acrylic compound which is copolymerized is less than 20% by weight and is preferably from 5% to 10% by weight of the total polymerized mixture.

In practicing the present invention, the amount of the acrylic compound will always be within the range stated above, i. e. less than 20%, but the relative proportions of the vinyl halide and vinylidene halide may vary, depending on the use to which the finished copolymer is to be put.

In general the ratio by weight of the vinyl halide to vinylidene halide may vary from 5 : 95 to 95 : 5, respectively. Within this range may be selected ratios of vinyl halide to vinylidene halide which will produce copolymers which are particularly suited to certain applications. Thus, if the copolymers are to be used for lacquer, the ratio will be from 35 : 65 to 85 : 15. If the copolymers are to be used in the manufacture of molded articles the ratio may be in the range of from 5 : 95 to 35 : 65 or it may be in the range from 85 : 15 to 95 : 5. Thus the present invention may be used to improve the properties of substantially all of the copolymers of vinyl halides and vinylidene halides.

The term vinyl halides and vinylidene halides as used herein applies to all of the vinyl halides and vinylidene halides including vinyl chloride, vinyl iodide, vinyl fluoride, vinyl bromide, vinylidene chloride, vinylidene bromide, vinylidene fluoride and vinylidene iodide. However, it is ordinarily preferred to use the chlorides because of their low cost and ready availability.

The acrylic type compounds which may be used in forming the copolymers of the present invention include the lower alkyl esters of acrylic and methacrylic acids. Preferably the alkyl group does not contain over 3 carbon atoms, although compounds having as many as 8 carbon atoms in the alkyl group may be used. Typical of the esters which may be used are methyl acrylate, methyl methacrylate, ethyl acrylate, ethyl methacrylate, propyl acrylate, propyl methacrylate, butyl acrylate, amyl methacrylate, hexyl acrylate, octyl acrylate and octyl methacrylate.

The copolymerization of the compounds set forth above may be carried out in a manner well known to those skilled in the art. One suitable method is to copolymerize the compounds in an aqueous emulsion using well known emulsifying agents such as the higher alkyl sulfates and their salts. The compounds may also be polymerized in a solution with a suitable solvent, or may be polymerized without the addition of a solvent or dispersing medium. As a polymerization catalyst, the peroxides are ordinarily used such as hydrogen peroxide, benzoyl peroxide, tertiary butyl hydroperoxide, di(tertiary-butyl) peroxide, barium peroxide, sodium perborate and the like. The amount of the catalyst is generally not critical and may be from about 0.1% to about 5% by weight of the material to be polymerized. The temperature of polymerization may vary from about 15° C. to about 100° C. and it is preferred to operate at temperatures of from 40° C. to 75° C.

The process of the invention is further illustrated by the following non-limiting examples:

Example I

Into a stainless steel autoclave equipped with a stirrer there was introduced 5,000 grams of water, 40 grams of 30% hydrogen peroxide solution, 140 grams of sodium cetyl sulfate and 10 grams 4 normal sulfuric acid. The pH value of the solution was 4.8. The temperature of the solution was raised to 43° C. and a mixture was introduced containing 625 grams vinylidene chloride, 500 grams vinyl chloride and 125 grams of methyl acrylate.

Polymerization started within a few hours and was terminated after 17 hours. The polymer suspension was coagulated by freezing out; the coagulated product was gelatinous and after washing and drying yielded a very elastic copolymer which could not be ground in a disintegrator. The copolymer was readily soluble in solvents such as esters, ketones and aromatic hydrocarbons. The polymerized methyl acrylate content amounted to 10% by weight, the polymerized vinyl chloride content to 40% by weight and the polymerized vinylidene chloride content to 50% by weight. The ratio of the polymerized vinyl chloride content to the polymerized vinylidene chloride content was 44.4 : 55.6. When this copolymer was dissolved in a solvent and the solvent was evaporated there was obtained a very supple film which was mechanically very strong. No plasticizer was needed in preparing the film. The film readily adhered to wood or metal and was very satisfactory in its adherence to aluminum alloys.

Example II

The experiment of Example I was repeated except that the polymerization temperature was 75° C. In this case the induction period lasted for 30 minutes and the rate of polymerization was 170 grams per hour per liter of emulsion.

The polymer was frozen out, washed and dried as above and the resulting polymer was somewhat elastic. The addition of plasticizers was not necessary to obtain the required plasticity. The adhesion of the copolymer to aluminum was good. When the copolymer was dissolved in a solvent, it yielded a low viscosity solution.

Example III

Into the same aqueous medium as described in Example I there was introduced a mixture containing 875 grams vinyl chloride, 250 grams vinylidene chloride and 75 grams methyl methacrylate. The temperature was maintained at 50° C. and the polymerization proceeded at the rate of 35 grams of polymer per liter of emulsion per hour. The dry polymer obtained from this suspension was less soluble than the products mentioned in the two previous examples, but the tensile strength of the films obtained from the solution was greater. The copolymer contained 6.3% by weight polymerized methyl methacrylate, 72.9% by weight polymerized vinyl chloride, and 20.8% by weight of polymerized vinylidene chloride. The ratio of the polymerized vinyl chloride to vinylidene chloride was 77.8 : 22.2.

Example IV

Into the same aqueous medium as described in Example I there was introduced a mixture containing 1030 grams vinylidene chloride, 125 grams vinyl chloride and 45 grams methyl acrylate. The temperature was maintained at 40° C. and the polymerization proceeded at 50 grams of polymer per liter of emulsion per hour. The polymer suspension was coagulated, washed and dried. The copolymer thus obtained could be rolled to a foil without the addition of a plasticizer and the foil so obtained was superior mechanically to foils obtained from copolymers containing only vinyl chloride and vinylidene chloride in similar ratios. The copolymer contained 3.8% by weight polymerized methyl acrylate, 10.4% by weight polymerized vinyl chloride and 85.8% by weight polymerized vinylidene chloride. The ratio of the polymerized vinyl chloride to polymerized vinylidene chloride was 10.8 : 89.2.

I claim as my invention:

1. A process comprising heating 95% to 80% by weight of a mixture of vinyl chloride and vinylidene chloride and 5% to 20% by weight of methyl methacrylate in an aqueous emulsion in the presence of a peroxide catalyst at a temperature between 15° C. and 100° C., the ratio of the vinyl chloride to vinylidene chloride in the said mixture being between 5 : 95 and 95 : 5.

2. A process comprising heating 95% to 80% by weight of a mixture of vinyl chloride and vinylidene chloride and 5% to 20% by weight of methyl acrylate in an aqueous emulsion in the presence of a peroxide catalyst at a temperature between 15° C. and 100° C., the ratio of the vinyl chloride to vinylidene chloride in the said mixture being between 5 : 95 and 95 : 5.

3. A process comprising heating 96.25% to 80% by weight of a mixture of vinyl chloride and vinylidene chloride and 3.75% to 20% by weight of a member of the group consisting of alkyl esters of acrylic acid wherein the alkyl radical of the alcohol portion of the ester molecule contains from 1 to 3 carbon atoms and alkyl esters of methacrylic acid wherein the alkyl radical of the alcohol portion of the ester molecule contains from 1 to 3 carbon atoms, at a temperature between 15° C. and 100° C. in the presence of a peroxide catalyst, the ratio of the vinyl chloride to vinylidene chloride in the said mixture being between 5 : 95 and 95 : 5.

4. In the production of polymerization products, the step which comprises heating 96.25% to 80% by weight of a mixture of a vinyl halide and a vinylidene halide and 3.75% to 20% by weight of a member of the group consisting of alkyl esters of acrylic acid wherein the alkyl radical of the alcohol portion of the ester molecule contains from 1 to 8 carbon atoms and alkyl esters of methacrylic acid wherein the alkyl radical of the alcohol portion of the ester molecule contains from 1 to 8 carbon atoms at a temperature between 15° C. and 100° C. in the presence of a peroxide catalyst, the ratio of the vinyl halide to vinylidene halide in the said mixture being from 35:65 to 85:15.

5. In the production of polymerization products, the step which comprises heating 96.25% to 80% by weight of a mixture of a vinyl halide and a vinylidene halide and 3.75% to 20% by weight of a member of the group consisting of alkyl esters of acrylic acid wherein the alkyl radical of the alcohol portion of the ester molecule contains from 1 to 8 carbon atoms and alkyl esters of methacrylic acid wherein the alkyl radical of the alcohol portion of the ester molecule contains from 1 to 8 carbon atoms in the presence of a peroxide catalyst, the ratio of the vinyl halide to vinylidene halide in the said mixture being from 5 : 95 to 95 : 5.

6. A composition comprising the product of polymerization of a mixture 85.8% by weight of vinylidene chloride, 10.4% by weight of vinyl chloride and 3.8% by weight of methyl acrylate.

7. A composition comprising the product of polymerization of a mixture of 72.9% by weight of vinyl chloride, 20.8% by weight of vinylidene chloride and 6.3% by weight of methyl methacrylate.

8. A composition comprising the product of polymerization of a mixture of 50% by weight of vinylidene chloride, 40% by weight of vinyl chloride and 10% by weight of methyl acrylate.

9. A composition comprising the product of polymerization of a mixture of 95% to 80% by weight of a mixture of vinyl chloride and vinylidene chloride and 5% to 20% by weight of methyl acrylate, the ratio by weight of vinyl chloride to vinylidene chloride in the said mixture being 5 : 95 and 95 : 5.

10. A composition comprising the product of polymerization of a mixture of 95% to 80% by weight of a mixture of vinyl chloride and vinylidene chloride and 5% to 20% by weight of a member of the group consisting of alkyl esters of acrylic acid wherein the alkyl radical of the alcohol portion of the ester molecules contains from 1 to 3 carbon atoms and alkyl esters of methacrylic acid wherein the alkyl radical of the alcohol portion of the ester molecules contains from 1 to 3 carbon atoms, the ratio by weight of vinyl chloride to vinylidene chloride in the said mixture being 5 : 95 and 95 : 5.

11. A composition comprising the product of polymerization of a mixture of 96.25% to 80% by weight of a mixture of a vinyl halide and a vinylidene halide and 3.75% to 20% by weight of a member of the group consisting of alkyl esters of acrylic acid wherein the alkyl radical of the alcohol portion of the ester molecules contains from 1 to 8 carbon atoms and alkyl esters of methacrylic acid wherein the alkyl radical of the alcohol portion of the ester molecules contains from 1 to 8 carbon atoms, the ratio by weight of the vinyl halide to the vinylidene halide in the said mixture being between 35 : 65 and 85 : 15.

12. A composition comprising the product of polymerization of a mixture of 96.25% to 80% by weight of a mixture of a vinyl halide and a vinylidene halide and 3.75% to 20% by weight of a member of the group consisting of alkyl esters of acrylic acid wherein the alkyl radical of the alcohol portion of the ester molecules contains from 1 to 8 carbon atoms and alkyl esters of methacrylic acid wherein the alkyl radical of the alcohol portion of the ester molecules contains from 1 to 8 carbon atoms, the ratio by weight of the vinyl halide to the vinylidene halide in the said mixture being between 5 : 95 to 95 : 5.

13. A tripolymer made by polymerizing a mixture of monomeric materials consisting of 75% to 90% by weight of vinylidene chloride, 5% to 15% of vinyl chloride, and 5% to 15% of an alkyl acrylate.

14. A tripolymer made by polymerizing a mixture of monomeric materials consisting of 75% to 90% by weight of vinylidene chloride, 5% to 15% of vinyl chloride and 5% to 15% of methyl acrylate.

15. A tripolymer made by polymerizing a mixture of monomeric materials consisting of 75% to 90% by weight of vinylidene chloride, 5% to 15% of vinyl chloride, and 5% to 15% of ethyl acrylate.

WILLEM LEENDERT JOHANNES DE NIE.

References Cited in the file of this patent

UNITED STATES PATENTS

| Number | Name | Date |
|---|---|---|
| 2,278,415 | Arnold | Apr. 7, 1942 |
| 2,404,781 | Arnold et al. | July 30, 1946 |